United States Patent Office 3,825,535
Patented July 23, 1974

3,825,535
HYDRAZINES, HYDRAZIDES AND HYDRAZONES OF ISOXAZOLOPYRIDINE CARBOXYLIC ACIDS AND ESTERS
Theodor Denzel, Nuremberg, and Hans Hoehn, Tegernheim, Germany, assignors to E. R. Squibb & Sons, Inc., Princeton, N.J.
No Drawing. Original application Mar. 29, 1971, Ser. No. 129,200, now Patent No. 3,736,325, dated May 29, 1973. Divided and this application Mar. 5, 1973, Ser. No. 337,811
Int. Cl. C07d 39/00
U.S. Cl. 260—240 G            8 Claims

ABSTRACT OF THE DISCLOSURE

New hydrazines, hydrazides and hydrazones of isoxazolo-pyridine carboxylic acids and esters having the general formulas

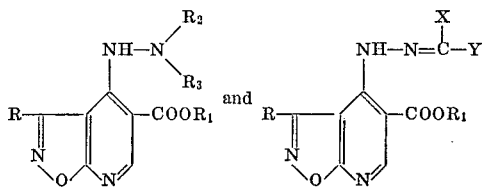

and salts thereof, are useful as central nervous system depressants and also increase the intracellular concentration of adenosine-3',5'-cyclic monophosphate.

---

This application is a division of application Ser. No. 129,200, filed Mar. 29, 1971, now U.S. Pat. 3,736,325 issued May 29, 1973.

SUMMARY OF THE INVENTION

This invention relates to new hydrazines, hydrazides and hydrazones of isoxazolo[5,4-b]pyridine-5-carboxylic acids and esters, and salts thereof. The new hydrazines, hydrazides and hydrazones have the structural formulas

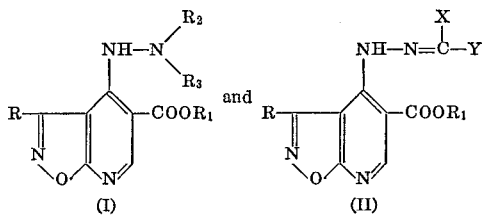

In formulas I and II, R and $R_1$ each represents hydrogen, lower alkyl, or phenyl-lower alkyl, $R_2$ represents hydrogen, lower alkyl, lower alkanoyl or phenyl, $R_3$ represents hydrogen, lower alkyl or lower alkanoyl, X represents hydrogen, lower alkyl, hydroxy-lower alkyl, phenyl, substituted phenyl, phenyl-lower alkyl or substituted phenyl-lower alkyl, Y represents lower alkyl, phenyl, hydroxy-lower alkyl, substituted phenyl, phenyl-lower alkyl or substituted phenyl-lower alkyl and together X and Y are cycloalkyl.

The lower alkyl groups represented by the symbols are straight or branched chain hydrocarbon groups of up to eight carbon atoms such as methyl, ethyl, propyl, isopropyl, butyl, isobutyl, t-butyl, amyl and the like.

Similar lower alkyl groups are part of the phenyl-lower alkyl substituents. The substituted phenyl and phenyl-lower alkyl groups include phenyl rings bearing one or two substituents, e.g., $R_4$, $R_5$-phenyl wherein $R_4$ and $R_5$ each is hydrogen, especially chlorine or bromine, lower alkyl or lower alkoxy. Thus there are included phenyl, chlorophenyl, e.g., o-, m- or -p-chlorophenyl, bromophenyl, o-, m- or p-tolyl, 2,5-dichlorophenyl, 3,5-dimethyl-phenyl, 3,4-dimethoxyphenyl, benzyl, phenethyl, o-, m- or p-chlorobenzyl, 3,5-dichlorobenzyl, p-methoxyphenyl and the like.

The lower alkanoyl groups include the acyl radicals of the lower fatty acids of up to eight carbon atoms, e.g., acetyl, propionyl, butyryl, isobutyryl and the like.

The cycloalkyl groups are cycloaliphatics having three to seven carbons, e.g., cyclopropyl, cyclobutyl, cyclopentyl, cyclohexyl and cycloheptyl.

Preferred compounds of formula I are those in which R and/or $R_1$ is hydrogen or lower alkyl, especially ethyl, and $R_2$ and $R_3$ each is hydrogen or lower alkyl. Preferred compounds of formula II are those in which R and $R_1$ are the same as specified for formula I and X and Y each is lower alkyl, especially methyl. Most preferred are those compounds of formula I wherein one of $R_2$ and $R_3$ is hydrogen and compounds of formula II wherein one of X and Y is hydrogen, especially when the substitutent is other than lower alkyl.

DETAILED DESCRIPTION

The new compounds are formed by the following series of reactions. The symbols in the structural formulas have the same meanings previously described.

A 5-aminoisoxazole of the formula (III)   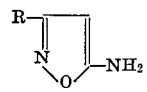

[produced by reacting 3-iminobutyronitrile with hydroxylamine analogous to the procedure described in Ann. Chem. 624, 22 (1959)], is made to react with an alkoxymethylene malonic acid ester of the formula (IV)   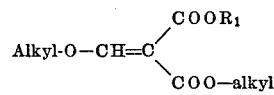

by heating at a temperature of about 120° C.
The resulting compound of the formula (V)   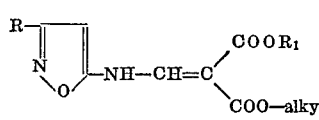

is cyclized in an inert organic solvent, such as diphenyl ether, at about 230° to about 260° C. while distilling off the alcohol formed, producing a compound of the formula (VI)   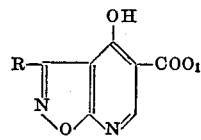

This is then alkylated by treatment with an alkyl halide in an inert organic solvent like dimethylformamide in the presence of an alkali metal carbonate to obtain a compound of the formula (VII)

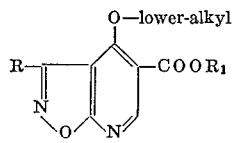

Alternatively, instead of alkylating the 4-hydroxy compound of formula VI, this 4-hydroxy compound may be refluxed for several hours with a phosphorus halide like phosphorus oxychloride to obtain an intermediate of the formula (VIII)

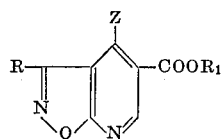

wherein Z is chlorine or bromine.

Alternatively, instead of cyclization of the malonic acid ethyl ester compound of formula V in an inert organic solvent at about 230° to 260° C. this product also undergoes cyclization by means of phosphorus oxychloride producing the intermediate of formula VIII.

The products of formula I are then prepared from either of the compounds of formula VII or VIII by reaction with an equivalent amount of the appropriate hydrazine of the formula (IX)

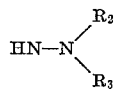

This reaction is effected by treating the reactants in an inert, preferably dry organic solvent either at room temperature or at an elevated temperature. In some instances it may be advantageous to make use of an autoclave.

The free acid, i.e., $R_1$ is hydrogen, may be obtained from the ester obtained as described above by hydrolysis, e.g., treatment with aqueous sodium hydroxide solution.

The hydrazone of formula II is obtained from the hydrazine of formula I (where $R_2$ and $R_3$ are both hydrogen) by reaction with a carbonyl compound, e.g., an aldehyde or ketone, in an inert organic solvent such as an alcohol. Such carbonyl compounds include, for example, acetaldehyde, propionaldehyde, butyraldehyde, benzaldehyde, acetaldehyde, phenylpropionaldehyde, p-chlorobenzaldehyde, m-bromobenzaldehyde, 2,5-dichlorobenzaldehyde, p-methoxybenzaldehyde, acetone, dihydroxyacetone, methyl ethyl ketone, methyl propyl ketone, acetophenone, phenylpropyl ketone, p-chlorophenyl ethyl ketone, cyclopropanone, cyclobutanone, cyclohexanone and the like.

A hydrazine of formula I wherein $R_2$ is hydrogen and $R_3$ is lower alkyl or cycloalkyl may alternatively be obtained by the catalytic reduction of an appropriately substituted compound of formula II.

The bases form salts by reaction with equivalent amounts of the common inorganic and organic acids. Such salts include the hydrohalides, e.g., hydrobromide, hydrochloride, sulfate, nitrate, phosphate, acetate, citrate, oxalate, tartrate, malate, succinate, benzoate, ascorbate, alkanesulfonate, e.g., methanesulfonate, arylsulfonate, e.g., benzenesulfonate, etc. It is frequently convenient to purify or isolate the product by forming an insoluble salt. The base may be obtained by neutralization and another salt then formed by treatment with the appropriate acid.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of formula I, or non-toxic, physiologically acceptable acid addition salt thereof, may be administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-cyclic monophosphate, and thus by the administration of about 1 to 100 mg./kg./day, preferably 10 to 50 mg./kg., in a single or two to four divided doses in conventional oral or parenteral dosage forms such as those described above may be used to alleviate the symptoms of asthma.

The following examples are illustrative of the invention. All temperatures are on the centigrade scale.

EXAMPLE 1

(a) (3-Methyl-5-isoxazolyl)aminomethylene malonic acid diethyl ester 112.5 g. of 3-methyl-5-aminoisoxazole (1.14 mol.) and 248 g. of ethoxymethylene malonic acid diethyl ester (1.14 mol.) are heated with stirring for 45 minutes at 130°. After this period, ethanol is removed under reduced pressure. The residue solidifies on cooling and is recrystallized from ethanol, m.p. 134–126°, yield 245 g. (80%).

(b) 5-Ethoxycarbonyl-4-hydroxy-3-methylisoxazolo-[5,4-b]pyridine 50 g. of (3-methyl-5-isoxazolo)aminoethylene malonic acid diethyl ester (0.19 mol.) are quickly added to 250 ml. of vigorously refluxing diphenyl ether. After 7 minutes, the reaction mixture is cooled rapidly. The solvent is distilled off in vacuo and the only residue crystallizes after adding 100 ml. of methanol. Recrystallization from methanol yields 20 g. (48%) of 5-ethoxycarbonyl-4-hydroxy-3-methylisoxazolo[5,4-b]pyridine, m.p. 150–152°.

(c) 4-Ethoxy-5-ethoxycarbonyl-3-methylisoxazolo [5,4-b]pyridine 22.2 g. of 5-ethoxycarbonyl-4-hydroxy-3-methylisoxazolo[5,4-b]pyridine (0.1 mol.) are dissolved in 150 ml. of ethanol and 28 g. of potassium carbonate (0.2 mol.) and 31 g. of ethyliodide (0.2 mol.) are added. The mixture is heated with stirring for 6 hours. The hot solution is filtered and the solvent is evaporated. The oily residue yields on crystallization with methanol 18.2 g. of 5-ethoxy - 5-ethoxycarbonyl-3-methylisoxazolo[5,4-b]pyridine, (73%) m.p. 62°.

(d) 4-Chloro-5-ethoxycarbonyl-3-methylisoxazolo [5,4-b]pyridine 50 g. of 5-ethoxycarbonyl-4-hydroxy-3-methylisoxazolo [5,4-b]pyridine (0.225 mol.) in 200 ml. of phosphorus oxychloride are refluxed for 4 hours at 120–130°. After this time, the excess phosphorus oxychloride is removed in vacuo and the residue is carefully neutralized with saturated sodium bicarbonate solution. The chloro compound is extracted 3 times with 100 ml. of chloroform. The organic layer is separated and dried over sodium sulfate, evaporated to dryness and the solid residue is recrystallized from ethanol, m.p. 92–94°, yield 36 g. (66%).

(e) 5-Ethoxycarbonyl-4-hydrazino-3-methylisoxazolo [5,4-b]pyridine

To a solution of 10 g. of hydrazine hydrate (0.2 mol.) in 100 ml. of tetrahydrofuran are dropped 24 g. of 4- chloro - 5 - ethoxycarbonyl-3-methylisoxazolo[5,4-b]pyridine (0.1 mol.) in 100 ml. of tetrahydrofuran. After the addition, the mixture is refluxed for 2 additional hours with continuous stirring. On cooling to room temperature and on adding 200 ml. of ether a white precipitate of hydrazine hydrochloride forms and is filtered off. The filtrate is evaporated to dryness and the residual 5-ethoxycarbonyl-4-hydrazino-3-methylisoxazolo[5,4-b]pyridine is recrystallized from ethanol, m.p. 154–156°, yield 16 g. (68%).

EXAMPLE 2

5-Ethoxycarbonyl-4-(2-isopropylidene)hydrazino-3-methylisoxazolo[5,4-b]pyridine 8.5 g. of 5-ethoxycarbonyl-4-hydrazino-3-methylisoxazolo[5,4-b]pyridine (0.0356 mol.), 4.2 g. of acetone (0.072 mol.) and 50 ml. of ethanol are refluxed for 2 hours. After this time the product precipitates on cooling and is filtered off. Recrystallization from ethanol yields 7 g. (70%) of pure product, m.p. 160–162°.

The hydrochloride of 5-ethoxycarbonyl-4-(2-isopropylidene)-hydrazino - 3 - methylisoxazolo[5,4-b]pyridine is formed by adding to a hot solution of the above obtained isopropylidene hydrazone compound is anhydrous ethanol, an alcoholic solution of hydrogen chloride. A white crystalline precipitate forms which is filtered off and washed with anhydrous ether.

EXAMPLE 3

By substituting an equivalent amount of acetic anhydride for the acetone in the procedure of Example 2, 5-ethoxycarbonyl - 4 - (2-acetyl hydrazino)-3-methylisoxazolo[5,4-b]pyridine is obtained, m.p. 197°, yield 58%.

EXAMPLE 4

By substituting an equivalent amount of benzaldehyde for the acetone in the procedure of Example 2, 4-(benzylidenehydrazino) - 5 - ethoxycarbonyl-3-methylisoxazolo[5,4-b]pyridine is obtained.

EXAMPLE 5

By substituting cyclohexanone for acetone in the procedure of Example 2, 4 - (clclohexylidenehydrazino)-5-ethoxycarbonyl - 3-methylisoxazolo[5,4-b]pyridine is obtained.

EXAMPLE 6

By substituting an equivalent amount of 5-aminoisoxazole for the 3-methyl-5-aminoisoxazole in the procedure of Example 1, 5 - ethoxycarbonyl-4-hydrazinoisoxazolo[5,4-b]pyridine is obtained.

By treating this compound with acetone as in Example 2 and with benzaldehyde as in Example 4, respectively, 5-ethoxycarbonyl-4-(2 - isopropylidenehydrazino)isoxazolo[5,4-b]pyridine and 5 - ethoxycarbonyl-4-(2-benzylidenehydrazino)isoxazolo[5,4-b]pyridine are obtained.

EXAMPLE 7

By treating the product of Example 1(c) with hydrazine hydrate according to the procedure of Example 1(e) 5-ethoxycarbonyl - 4 - hydrazino-3-methylisoxazolo[5,4-b]pyridine is obtained. Then by treating this hydrazine with acetophenone according to the procedure of Example 2, 5-ethoxycarbonyl-4-(phenylidenehydrazino)-3-methylisoxazolo[5,4-b]pyridine is obtained. The hydrobromide is obtained as in Example 2 substituting hydrogen bromide solution for the hydrogen chloride solution.

EXAMPLES 8–14

By using the 5-aminoisoxazolo with the substituents indicated in the first column below in place of 3-methyl-5-aminoisoxazole and following the procedure of Example 1, alkylating with ethyl iodide as in part (c) or following the procedure of part (d), then treating with hydrazine hydrate or substituted hydrazine as in part (e), there are obtained the following hydrazines:

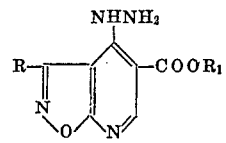

| | 5-aminoisoxazole | Hydrazine | |
|---|---|---|---|
| Example | R | $R_1$ | R |
| 8 | $CH_3$ | $C_2H_5$ | $CH_3$ |
| 9 | H | $CH_3$ | H |
| 10 | H | H | H |
| 11 | $C_6H_5CH_2$ | H | $C_6H_5CH_2$ |
| 12 | $(CH_3)_2CH$ | $C_6H_5CH_2$ | $(CH_3)_2CH$ |
| 13 | H | $C_6H_5CH_2CH_2$ | H |
| 14 | $C_6H_5CH_2$ | $CH_3$ | $C_6H_5CH_2$ |

Treatment of each of the hydrazines thus obtained with acetone as in Example 2 yields the 5-carboxy- or 5-carboalkoxy - 4 - isopropylidenehydrazinoisoxazolo[5,4-b]pyridine having the same substituents R and $R_1$ listed in the second column above. Similarly, by substituting for the acetone and equivalent amount of benzaldehyde, p-chlorobenzaldehyde, cyclopentanone or acetophenone, respectively, the 4-benzylidenehydrazine, 4-(4-chlorobenzylidene)hydrazine, 4-cyclopentylidene hydrazine and 4-(1-phenethylidene)hydrazine, respectively, are obtained.

The following additional compounds are produced by the procedure of Example 2.

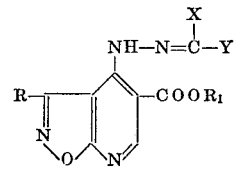

| Example | $R_1$ | R | X | Y |
|---|---|---|---|---|
| 15 | $C_2H_5$ | H | $(CH_2)_3CH_3$ | $(CH_2)_3CH_3$ |
| 16 | $(CH_2)_3CH_3$ | H | $CH_3$ | $CH_3$ |
| 17 | $C_2H_5$ | H | $CH_3$ | $CH_3$ |
| 18 | $C_2H_5$ | H | $CH_3$ | $CH_3$ |

EXAMPLE 19

By substituting an equivalent amount of phenylhydrazine for the hydrazine hydrate in the procedure of Example 1(e), 5-ethoxycarbonyl-(2-phenylhydrazino)-3-methylisoxazolo[5,4-b]-pyridine is obtained.

EXAMPLE 20

By substituting an aquivalent amount of dihydroxyacetone for the acetone in the procedure of Example 2, 5-ethoxycarbonyl-4-[[2-hydroxy - 1 - (hydroxymethyl)ethylidene]hydrazino]-3-methylisoxazolo[5,4 - b]pyridine is obtained.

EXAMPLE 21

By substituting an equivalent amount of tertiarybutylhydrazine for the hydrazine in Example 1(e) 5-ethoxycarbonyl-4-(2 - tertiary - butylhydrazino) - 3 - methylisoxazolo[5,4-b]pyridine is obtained.

What is claimed is:
1. A compound of the formula

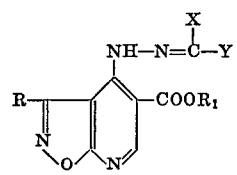

wherein R and $R_1$ each is hydrogen, lower alkyl, benzyl or phenethyl, X is hydrogen, lower alkyl or hydroxylower alkyl, Y is lower alkyl, hydroxy-lower alkyl, phenyl, $R_4$-phenyl, phenyl-lower alkyl or $R_4$-phenyl-lower alkyl, $R_4$ is halogen, lower alkyl or lower alkoxy, and together X and Y are cyclo-lower alkyl, and physiologically acceptable acid addition salts thereof.

2. A compound as in Claim 1 wherein X and Y each is lower alkyl.

3. A compound as in Claim 1 wherein R, $R_1$, X and Y each is lower alkyl.

4. A compound as in Claim 1 wherein R is methyl, $R_1$ is ethyl and X and Y each is methyl.

5. A compound as in Claim 1 wherein R is methyl, $R_1$ is ethyl, X is hydrogen and Y is phenyl.

6. A compound as in Claim 1 wherein R is hydrogen, $R_1$ is ethyl and X and Y each is methyl.

7. A compound as in Claim 1 wherein R is methyl, $R_1$ is ethyl and X and Y together form cyclohexyl.

8. A compound as in Claim 1 wherein R and X each is hydrogen, $R_1$ is ethyl and Y is phenyl.

References Cited

UNITED STATES PATENTS

| | | | |
|---|---|---|---|
| 3,381,016 | 4/1968 | Markillie | 260—296 |
| 3,736,325 | 5/1973 | Denzel et al. | 260—295.5 B |
| 3,736,327 | 5/1973 | Denzel et al. | 260—296 H |

FOREIGN PATENTS

| | | | |
|---|---|---|---|
| 1,513,038 | 2/1968 | France | 260—296 |

OTHER REFERENCES

Adachi et al., Chem. Pharm. Bull. (Tokyo) 1968, pp. 117–124.

JOHN D. RANDOLPH, Primary Examiner

U.S. Cl. X.R.

260—240 J, 294.8 C, 295.5 B, 295.5 S; 424—266